Patented Feb. 25, 1936

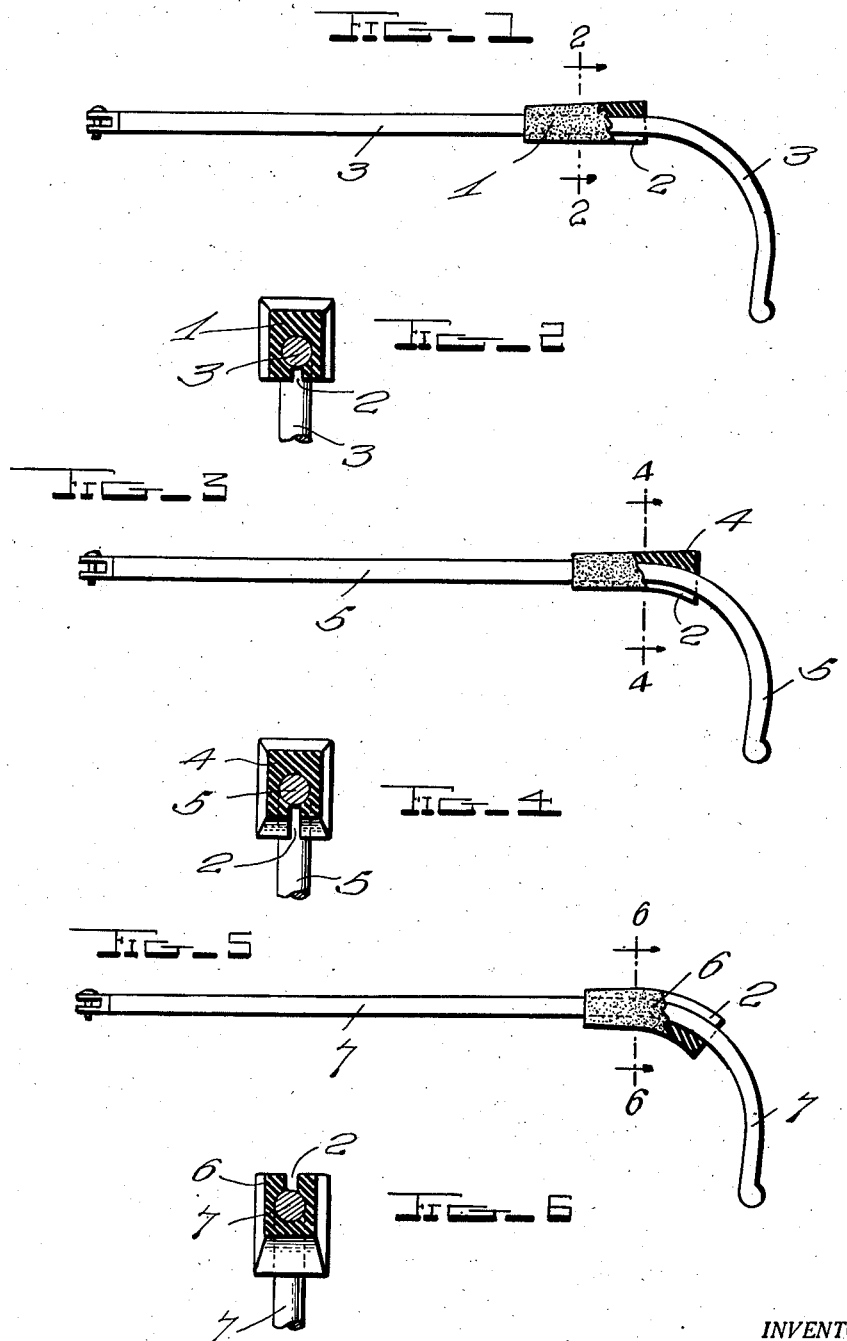

2,031,771

UNITED STATES PATENT OFFICE 2,031,771

TEMPLE FOR EYEGLASSES

Frank L. Grier, Milford, Del.

Application November 1, 1934, Serial No. 751,058

3 Claims. (Cl. 88—52)

This invention relates to improvements in temples for eyeglasses, and more particularly to an attachment which may be secured to, or built into the temple for exerting a drag on the temple to prevent the sliding forward of the temple when worn, thereby retaining the lens of the eyeglasses in their proper adjustment with respect to the eyes of the wearer.

An object of the invention is to provide a temple for eyeglasses with a drag member, whereby the temple will be held from slipping forward.

Another object of the invention is to provide a live rubber drag member on the temple of a pair of eyeglasses, which will positively engage with the side of the wearer's head, or with the ear, for retaining the temple from slipping forward, thereby insuring the proper adjustment and relation between the lens of the eyeglasses and the eyes of the wearer.

A further object of the invention is to provide a drag member for eyeglass temples, which may be adjusted on and fitted to any type of temples, to retain the same in the proper adjusted position.

Other objects will appear as the description proceeds.

In the accompanying drawing which forms a part of my application,

Figure 1 is a side elevation of a temple with one form of drag applied thereto;

Figure 2 is a section on the line 2—2 of Figure 1;

Figure 3 is a side elevation of a modified form of drag member applied to a temple;

Figure 4 is a section on the line 4—4 of Figure 3;

Figure 5 is a side elevation of another modified form of drag member applied to a temple; and Figure 6 is a section on the line 6—6 of Figure 5.

Like characters of reference are used throughout the following specification and the accompanying drawing to designate corresponding parts.

In carrying out my invention, I employ a drag member 1, preferably formed of sponge or live rubber, which will be split longitudinally as at 2, whereby the drag may be fitted on to any type of temple 3. The drag 1 will be decreasingly tapered from its rear end towards its front end as clearly illustrated in Figure 2 of the drawing, thus affording a drag contact and bearing not only on the top of the ear, but also between the side of the wearer's head and the inner surface of the upper lobe of the ear.

The object of the several forms of temple drags is to prevent the slipping forward of the temples when the eyeglasses are in position upon a wearer, and to accomplish this result by definitely and positively engaging the side of the wearer's head and the inside portion of the wearer's ear.

In the modified form illustrated in Figures 3 and 4, I utilize a live rubber insert 4 for the drag, which will be interposed between the two portions of the temple 5 which will add flexibility to the temple. In this modification the drag 4 is curved to the shape of the groove between the head and ear and is also tapered decreasingly from its rear to its front portion or end along its four sides.

In the modified form of drag illustrated in Figures 5 and 6, I employ a live rubber drag member 6 supported on the under side of the temple 7, at its forward point of curvature, thus obtaining a curved drag area.

It will be apparent that the contacting surface or surfaces of the drags may be roughened to further prevent slipping of the temples, but with live or sponge rubber, I find drags thus formed to give perfect holding security.

Many minor changes in detail of construction may be resorted to without departure from the spirit of the invention.

Having thus described my invention what I claim as new and desire to secure by Letters Patent of the United States is:

1. A combined drag and bearing member for temples for eyeglasses comprising a live rubber ferrule positioned at the curve of the temples and having its outer surfaces decreasingly tapered from the rear to the front end, and having its lower surface conforming to the curvature of that portion of the ear which it engages.

2. A combined drag and bearing member for temples for eyeglasses comprising a live rubber ferrule positioned at the curve of the temples adapted to engage the adjacent portion of the wearer's head and ear, and the portion of the drag below the temple being heavier and of larger dimension than the portion of the drag lying above the temple.

3. A combined drag and bearing member for temples for eyeglasses comprising a live rubber ferrule positioned at the curve of the temples adapted to engage the adjacent portion of the wearer's head and ear, and the portion of the drag above the temple being heavier and of larger dimension than the portion of the drag lying below the temple.

FRANK L. GRIER.